United States Patent
Levey et al.

(10) Patent No.: US 7,593,105 B2
(45) Date of Patent: *Sep. 22, 2009

(54) TRISTIMULUS COLORIMETER HAVING INTEGRAL DYE FILTERS

(75) Inventors: Brian Levey, Yardley, PA (US); Colman Shannon, Lawrenceville, NJ (US); David Slocum, Yardley, PA (US)

(73) Assignee: Datacolor Holding AG, Luzen (CH)

( * ) Notice: Subject to any disclaimer, the term of this patent is extended or adjusted under 35 U.S.C. 154(b) by 177 days.

This patent is subject to a terminal disclaimer.

(21) Appl. No.: 11/281,152

(22) Filed: Nov. 16, 2005

(65) Prior Publication Data

US 2006/0119849 A1 Jun. 8, 2006

Related U.S. Application Data

(60) Provisional application No. 60/628,610, filed on Nov. 17, 2004.

(51) Int. Cl.
*G01N 21/25* (2006.01)

(52) U.S. Cl. .................................... 356/419

(58) Field of Classification Search .................. 356/419
See application file for complete search history.

(56) References Cited

U.S. PATENT DOCUMENTS

| | | | |
|---|---|---|---|
| 4,150,898 A | 4/1979 | Suga | |
| 4,547,074 A | 10/1985 | Hinoda et al. | |
| 4,764,670 A * | 8/1988 | Pace et al. | 250/226 |
| 4,830,501 A | 5/1989 | Terashita | |
| 4,876,167 A * | 10/1989 | Snow et al. | 430/7 |
| 4,923,860 A | 5/1990 | Simons | |
| 4,965,242 A | 10/1990 | De Boer et al. | |
| 5,144,498 A * | 9/1992 | Vincent | 359/885 |
| 5,166,126 A | 11/1992 | Harrison et al. | |
| 5,168,320 A | 12/1992 | Lutz et al. | |
| 5,272,518 A | 12/1993 | Vincent | |
| 5,419,990 A | 5/1995 | Wake et al. | |
| 5,521,035 A | 5/1996 | Wolk et al. | |
| 5,599,766 A | 2/1997 | Boroson et al. | |
| 5,631,703 A * | 5/1997 | Hamilton et al. | 348/273 |
| 5,671,059 A | 9/1997 | Vincent | |
| 5,691,817 A | 11/1997 | Cargill et al. | |
| 5,719,074 A | 2/1998 | Hawkins et al. | |
| 5,726,805 A | 3/1998 | Kaushik et al. | |
| 5,729,360 A | 3/1998 | Kita et al. | |
| 5,871,871 A | 2/1999 | Hogan et al. | |
| 5,892,585 A | 4/1999 | Lianza et al. | |

(Continued)

OTHER PUBLICATIONS

Sharma, G. and Trussell, J.H., "Digital Color Imaging", Jul. 1997, IEEE Transactions on Image Processing, vol. 6, No. 7.*

(Continued)

*Primary Examiner*—Kara E Geisel

(57) ABSTRACT

A tristimulus colorimeter on a single semiconductor chip having at least three detectors, each detector being coated by colorant filters, each filter having at least one layer and at least one filter having a double layer is provided. The colorimeter determines CIE tristimulus values of an incident light from inputs to the filters and detectors. Colorimeters having integral dye filters may be constructed on a single silicon chip embodying all the detectors and electronics, coated over each detector by a deposited filter layer. Colorants may be directly deposited on the detectors, rather than using a plastic substrate for a filter.

4 Claims, 18 Drawing Sheets

U.S. PATENT DOCUMENTS

| | | | |
|---|---|---|---|
| 5,926,282 A * | 7/1999 | Knobloch et al. | 356/419 |
| 5,929,432 A * | 7/1999 | Yamakawa | 250/208.1 |
| 5,963,333 A | 10/1999 | Walowit et al. | |
| 6,020,583 A | 2/2000 | Walowit et al. | |
| 6,083,649 A | 7/2000 | Takeshita et al. | |
| 6,111,300 A | 8/2000 | Cao et al. | |
| 6,147,761 A | 11/2000 | Walowit et al. | |
| 6,163,377 A * | 12/2000 | Boles et al. | 356/402 |
| 6,252,663 B1 * | 6/2001 | Cooper | 356/416 |
| 6,330,029 B1 * | 12/2001 | Hamilton et al. | 348/272 |
| 6,362,513 B2 | 3/2002 | Wester | |
| 6,365,304 B2 | 4/2002 | Simons | |
| 6,566,723 B1 | 5/2003 | Vook et al. | |
| 6,604,466 B2 | 8/2003 | Komori et al. | |
| 6,628,331 B1 * | 9/2003 | Bean | 348/273 |
| 6,760,475 B1 | 7/2004 | Miller | |
| 6,771,314 B1 | 8/2004 | Bawolek et al. | |
| 6,774,988 B2 * | 8/2004 | Stam et al. | 356/218 |
| 6,804,006 B2 | 10/2004 | Griffus et al. | |
| 6,816,262 B1 * | 11/2004 | Slocum et al. | 356/416 |
| 6,933,168 B2 | 8/2005 | Bawolek et al. | |
| 6,947,143 B2 | 9/2005 | Kritchman et al. | |
| 7,095,009 B2 | 8/2006 | Harada et al. | |
| 7,132,644 B2 | 11/2006 | Grunert et al. | |
| 2002/0003201 A1 | 1/2002 | Yu | |
| 2003/0128310 A1 | 7/2003 | Takizawa et al. | |
| 2003/0218123 A1 | 11/2003 | Harada et al. | |
| 2004/0100570 A1 | 5/2004 | Shizukuishi | |
| 2004/0105265 A1 | 6/2004 | Takizawa | |
| 2004/0114144 A1 * | 6/2004 | Lutz et al. | 356/419 |
| 2005/0078187 A1 | 4/2005 | Fabricius et al. | |
| 2005/0205765 A1 * | 9/2005 | Tan et al. | 250/226 |
| 2005/0206759 A1 | 9/2005 | Fukunaga et al. | |
| 2005/0207044 A1 | 9/2005 | Oon et al. | |
| 2006/0103864 A1 | 5/2006 | Shannon et al. | |
| 2006/0215193 A1 | 9/2006 | Shannon et al. | |

OTHER PUBLICATIONS

Richard F. Lyon and Paul M. Hubel, "Eyeing the Camera: into the Next Century," Imaging Science & Technology, Society for Info. Display, Color Imagery Conference, Nov. 2002, Scottsdale, AZ.

MAZeT presents True Colour Sensors for Colorimetric, Press Release, MAZeT GmbH, http://www.omimo.be/vpr/layout/display/pr.asp?PRID=7628, Aug. 26, 2004.

"True Color ICs Allow Colour Measurement To DIN 5033," MAZeT Gmb H, http://www.mazet.de/produkte/farbsensoren/mtcs/en, 2005.

"Modular JENCOLOUR OEM Hardware Solution" MAZeT Gmb H, http://www.mazet.de/produkte/farbsensoren/mtcs/en, 2005.

"Data Sheet MTCSiCS, Integral True Colour Sensor—LCC8" MAZeT Gmb H, http://www.mazet.de/produkte/farbsensoren/mtcs/en, Apr. 18, 2005.

"Data Sheet MTCSICT, Integral True Colour Sensor—TO39" MAZeT Gmb H, http://www.mazet.de/produkte/farbsensoren/mtcs/en, Apr. 18, 2005.

"Data Sheet MTCSICO, Integral True Colour Sensor—TO39 with optics" MAZeT Gmb H, http://www.mazet.de/produkte/farbsensoren/mtcs/en, Apr. 18, 2005.

R. W. G. Hunt, Measuring Colour, second ed., pp. 178-181, Ellis Horwood Limited, 1991.

Vos, J.J., Colorimetric and photometric properties of a 2 degree fundamental observer, Color Res. & Appl. 3, 125-128 (1978).

Oriel Instrument Catalog, Figure 5, p. 6-23, 2000.

International Search Report and Written Opinion for PCT/US2006/010724; mailing date Sep. 15, 2006; date of receipt Sep. 18, 2006; copy consists of 12 unnumbered pages.

Mark Wolski, et al., "Optimization of Sensor Response Functions for Colorimetry of Reflective and Emissive Objects," IEEE Transactions on Image Processing, IEEE Service Center, Piscataway, NJ, US, vol. 5, No. 3, Mar. 1996 XP011025973 ISSN: 1057-7149.

Engelhardt, K., et al., "Optimum Color Filters for CCD Digital Cameras" Applied Optics, OSA, Optical Society of America, Washington, DC, US, vol. 32, No. 18, Jun. 1, 1993, pp. 3015-3023, XP000345897 ISSN: 0003-6935.

PCT International Search Report for PCT/US06/10899; dated Jul. 10, 2007, copy consists of 8 unnumbered pages.

PCT International Search Report for PCT/US05/41628; dated Feb. 16, 2007, copy consists of 9 unnumbered pages.

PCT International Search Report for PCT/US2006/010724; dated Aug. 11, 2008, copy consists of 8 unnumbered pages.

* cited by examiner

X = ( F1 detector * $C_{x1}$ ) + ( F2 detector * $C_{x2}$ ) + ( F3 detector * $C_{x3}$ ) + ( F4 detector * $C_{x4}$ ) ;
Y = ( F1 detector * $C_{y1}$ ) + ( F2 detector * $C_{y2}$ ) + ( F3 detector * $C_{y3}$ ) + ( F4 detector * $C_{y4}$ ) ;
Z = ( F1 detector * $C_{z1}$ ) + ( F2 detector * $C_{z2}$ ) + ( F3 detector * $C_{z3}$ ) + ( F4 detector * $C_{z4}$ ) ;

FIG. 8A

| X Coef | Value | Y Coef | Value | Z Coef | Value |
|---|---|---|---|---|---|
| $C_{x1}$ = | 0.020482 | $C_{y1}$ = | 0.006561 | $C_{z1}$ = | 0.003158 |
| $C_{x2}$ = | 0.081360 | $C_{y2}$ = | 0.017303 | $C_{z2}$ = | 0.007581 |
| $C_{x3}$ = | 0.077814 | $C_{y3}$ = | 0.001845 | $C_{z3}$ = | 0.503504 |
| $C_{x4}$ = | 0.096484 | $C_{y4}$ = | 0.049131 | $C_{z4}$ = | 0.006500 |

FIG. 8B

TRISTIMULUS COLORIMETER HAVING INTEGRAL DYE FILTERS

CROSS-REFERENCES

The present application claims the benefit of Provisional Application No. 60/628,610, filed Nov. 17, 2004, which is herein incorporated by reference. The present application is related to commonly owned U.S. Pat. No. 6,163,377, issued Dec. 19, 2000, which is herein incorporated by reference. In addition, the present application is related to commonly owned U.S. Application, entitled "METHOD FOR DESIGNING A COLORIMETER HAVING INTEGRAL CIE COLOR-MATCHING FILTERS", Ser. No. 11/281,766, filed Nov. 16, 2005, which is herein incorporated by reference.

BACKGROUND

1. Field of the Invention

The present invention generally relates to optics and colorimetry and, in particular, relates to tristimulus colorimeters having integral dye filters that measure the color content of light that has a response mimicking the response to color of the human eye, as may be represented by the Commission Internationale de l'Eclairage (CIE) color-matching functions.

2. Description of the Related Art

Optical filters are used in many color-related applications, including various color measurement systems, such as calorimeters. There are many types of filters, including absorptive filters, interference filters, and others. A photoelectric tristimulus colorimeter is used to measure the color of the light emitted from a light source, such as a computer display screen. This is an emissive color measurement, but there are also reflective color measurement devices. An emissive photoelectric calorimeter directs the light from the light source to be measured through an optical system toward three or more photoelectric detecting devices. A primary filter is positioned in front of each photoelectric detecting device. Each primary filter conforms, as close as possible, the spectral sensitivity of the photoelectric detecting device to the respective color-matching functions. A measuring device, which is connected to the photoelectric detecting devices, reads or measures the amounts of the respective primaries or tristimulus values in response to the incident light.

Although it is theoretically possible to design primary filters exactly corresponding to an ideal, it is practically impossible to manufacture primary filters having transmission factors exactly corresponding to the ideal. This is because an error is inherent in measuring primary or tristimulus values of the color sample. This error is caused by differences between actual and theoretical transmission factors of the primary filters.

Past attempts to correct this error have involved attempts to alter the transmission factor characteristics of the primary filters by forming the primary filters using a number of superimposed colored plates. However, because the spectral characteristics of the colored plates depend upon the components of the materials used in the plates—normally glass—it was generally impossible to exactly match the theoretical transmission factors. It was prohibitively difficult to accurately duplicate the theoretical transmission values over the complete wavelength range of the primaries or tristimulus values. These past attempts that increased the number of plates, undesirably decreased the amount of light received or passed through the primary filter. In addition, past attempts to fabricate primary filters by carefully superimposing a number of plates in an attempt to match theoretical transmission factors were time consuming and expensive to make.

SUMMARY OF THE INVENTION

The present invention includes various embodiments of a calorimeter having integral dye filters.

One embodiment is a solid-state color-measuring device, including light detectors and colorants. The colorants are permanently deposited onto the solid-state color-measuring device. The colorants comprise optical filters such that light passes through the filters and causes the light detectors to produce output. The output has spectral responses that are linearly combined to approximate a set of CIE-like color-matching functions.

Another embodiment is a calorimeter, including a semiconductor substrate having three or more photodetectors and three or more filters permanently deposited on the photodetectors. Each filter has one or more single layer and one or more filter has a double layer. The response of the integral filters and photodetectors approximates a set of CIE-like target color-matching functions. The channels include the photodetectors and filters so that linear combinations of the spectral responses of the channels approximate a set of CIE-like target color-matching functions.

Other embodiments include the following systems having such a calorimeter: computer monitor calibration systems, home theater display calibration systems, projector calibration systems, ambient light measurement systems, and LED measurement and control applications.

BRIEF DESCRIPTION OF THE DRAWINGS

The teachings of the present invention can be readily understood by considering the following detailed description in conjunction with the accompanying drawings, in which:

FIG. 8A is a list of an exemplary set of equations to calculate tristimulus values using the exemplary embodiment of FIGS. 2A and 2B;

FIG. 8B is a table of exemplary coefficients computed using the equations of FIG. 8A for the best fit of FIG. 7;

To facilitate understanding, identical reference numerals have been used, where possible, to designate identical elements that are common to the figures.

DETAILED DESCRIPTION

Figure 1:
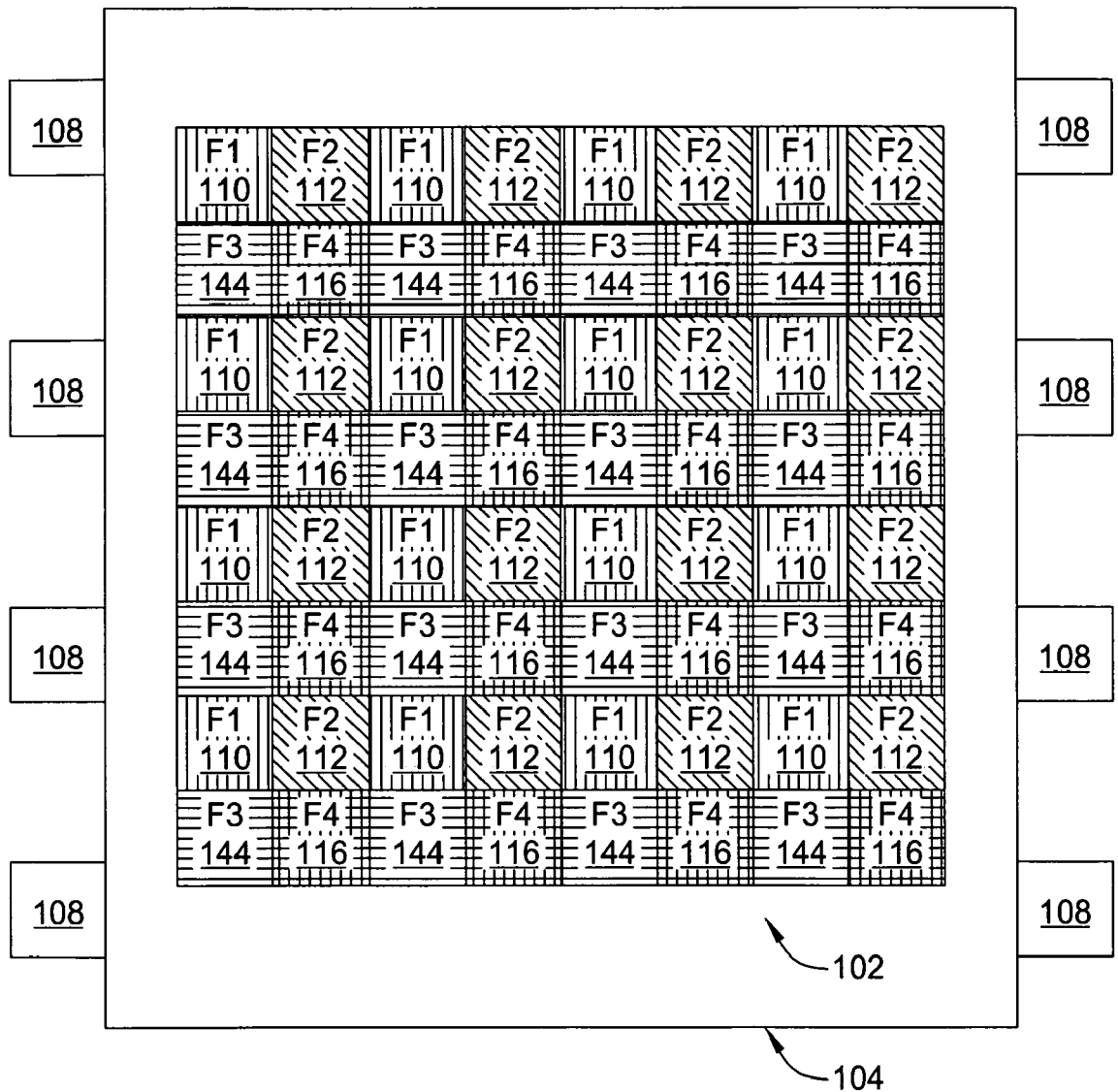
FIG. 1 is a top view of an exemplary embodiment of a configuration of dye filter layers on a semiconductor chip having photodetectors.

The present invention includes various embodiments of a colorimeter having integral dye filters embedded onto a semiconductor chip. Dye filters include colorants pigments, dyes, and the like. Some embodiments described include a computer monitor calibration system, a home theatre display calibration system, a projector calibration system, an ambient light measurement system, a light emitting diode (LED) measurement and control application, and combinations thereof, each including a colorimeter having integral dye filters embedded onto a semiconductor chip. However, embodiments of the present invention have many applications in colorimetry in addition to these. Colorimetry is the science and practice of determining and specifying colors and quantitative analysis by color comparison. In colorimetry, colors can be described in numbers and physical color can be matched using a variety of measurement instruments, such as calorimeters, spectrophotometers, densitometers, and spectroradiometers. Colorimetry is used in many industries, including photography, soft-proofing, digital color communication, interior design, architecture, consumer electronics, chemistry, color printing, textile manufacturing, and paint manufacturing. A person of ordinary skill in the art will recognize that the present invention is applicable to many applications of colorimetry in many industries and to many kinds of measurement instruments.

One embodiment is a color-measuring device, such as a colorimeter. The calorimeter is a solid-state device having light detectors and filters. Colorants are permanently deposited onto the solid-state device using methods familiar to those of ordinary skill in the art of manufacturing solid-state light detectors. The device has an output of spectral responses that are linearly combined to approximate CIE or CIE-like color-matching functions. Some examples of CIE-like color matching functions include the CIE 1931 2-degree color-matching functions, CIE 1964 10-degree color-matching functions, or modifications of the CIE functions, such as derived by D. Judd (1951) or by J. J Vos (1978). In one embodiment, the colorants are in the form of dyes or pigments. In one embodiment, the filters include a number of colorants of various thicknesses and in various combinations. The colorants are permanently deposited onto either a single detector or a plurality of detectors on the device.

One embodiment is a method of designing such a color-measuring device. A solution of combinations of colorants is derived, where the solution maximizes the number of combinations of colorants used singly and minimizes the combinations of colorants. In one embodiment, this method is computational and may operate on a processor. In one embodiment, the method results in a selection of the best or the optimum combination of colorants according to predetermined criteria. The combination of colorants is used on the light detectors, which have known responses to light photons. The colorants are computationally selected from a larger set of colorants. The computation takes into account the combined response of the colorants and the detectors to select the best or optimum solution so that the output of the device has spectral responses that are close to or approximate CIE or CIE-like color-matching functions and so that the performance of the device meets predetermined criteria.

Figure 2A:
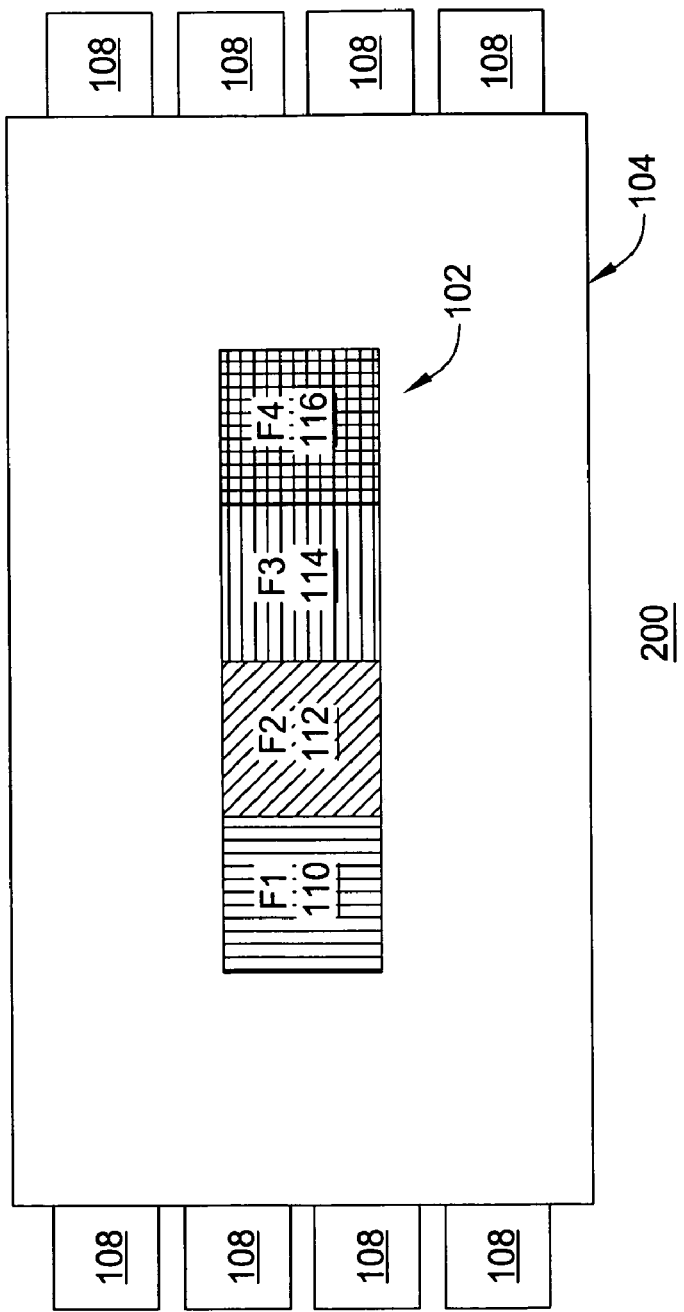
FIG. 2A is a top view of an exemplary embodiment of another configuration of dye filter layers on a semiconductor chip having photodetectors.
Figure 2B:
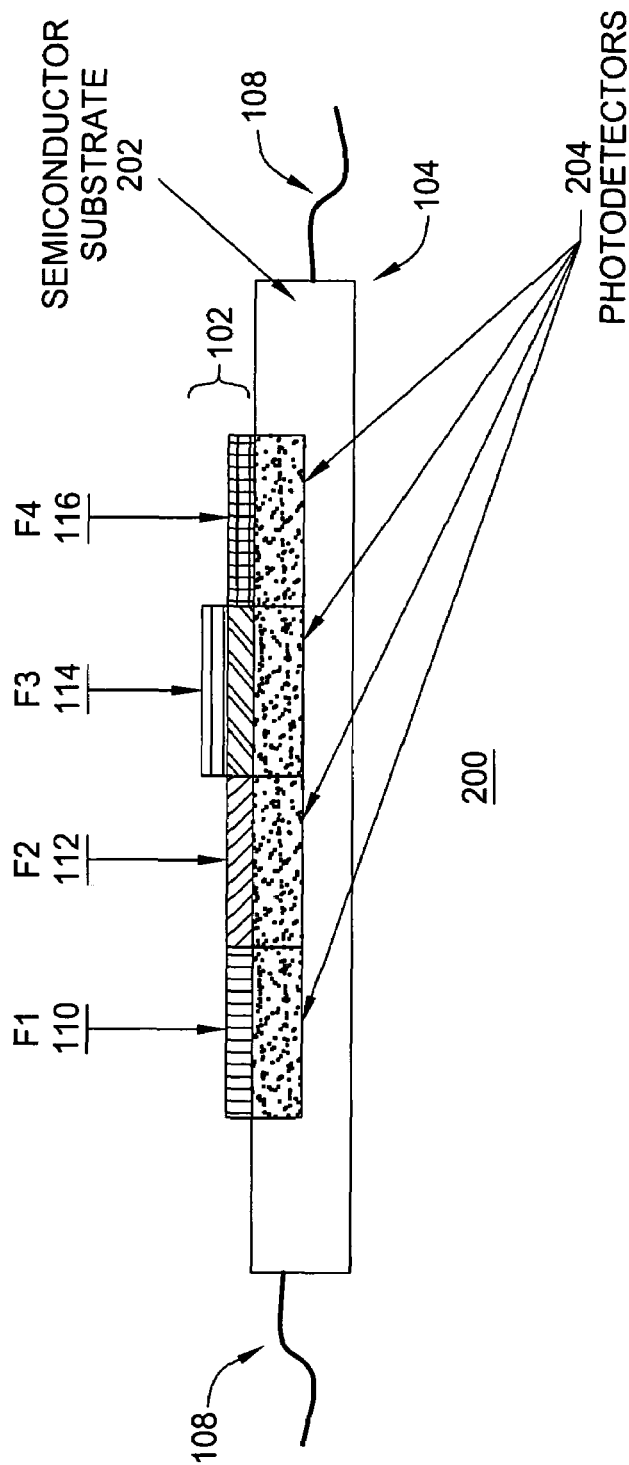
FIG. 2B is a side view of FIG. 2A.

FIG. 1 is a top view of an exemplary embodiment of a configuration 100 of dye filter layers 102 on a semiconductor chip, (e.g., a light-to-frequency semiconductor device) having photodetectors (not shown; see FIG. 2B). Photodetectors are also known as photodiodes, photosensor elements, and photodetecting elements. The semiconductor chip 104 has a standard 8-pin 108 integrated circuit package. There are many possible configurations 100 of three or more dye filter layers 102 and FIG. 1 illustrates one possible configuration 100. In FIG. 1, there are 64 dye filter layers 102 that are integral with 64 photodetectors in an 8×8 grid pattern. Each photodetector is covered by one of four types of absorptive colorant filters, e.g., F1 110, F2 112, F3 114, and F4 116. In FIG. 1, 16 photodetectors are covered by red F1 110 filters, 16 photodetectors are covered by green F2 112 filters, 16 photodetectors are covered by dark blue F3 114 filters, and 16 photodetectors are covered by yellow F4 116 filters. The dark blue F3 114 filters are a double layer: one layer of cyan and one layer of magenta. The red F1 110, green F2 112, and yellow F4 116 filters are a single layer. Other embodiments include more or less types of filters. Each of the filters can be a single or multiple layer structure (e.g., FIGS. 2b and 3b).

FIG. 2A is a top view of an exemplary embodiment of another configuration 200 of dye filter layers 102 on a semiconductor chip 104 having photodetectors (not shown; see FIG. 2B). The semiconductor chip 104 has a standard 8-pin 108 integrated circuit package. Other embodiments have a different number of pins. In FIG. 2A, each photodetector is covered by one of four types of integral absorptive colorant layers 102, (i.e., F1 110, F2 112, F3 114, and F4 116), each of which may be a single or multiple layer structure. Colorants include pigments, dyes, and the like. F1 110 is a single red layer, F2 112 is a single green layer, F3 114 is a dark blue layer (as seen from the top) that is a double layer of cyan and magenta (as seen from the side in FIG. 2B) and F4 116 is a single yellow layer.

FIG. 2B is a side view of FIG. 2A, showing a cross section of the dye filter layers 102. In this exemplary embodiment, the semiconductor chip 104 includes a semiconductor substrate 202 constructed (e.g., by depositing) with four photodetectors 204 and four dye filter layers 102. Each dye filter layer 102 is integral with one of the photodetectors 204. In FIG. 2B, F1 110, F2 112, and F4 116 are single-layer structures, while F3 114 is a double-layer structure. F1 110 is a single red layer, F2 112 is a single green layer, F3 114 is a double cyan and magenta layer, and F4 116 is a single yellow layer. In other embodiments, there are at least three photodetectors 204 with corresponding dye filters 102. In other embodiments, the dye filter layers 102 may have various layer structures with any number of layers and each filter may be a single or multiple layer structure (i.e., two or more layers).

Figure 3A:
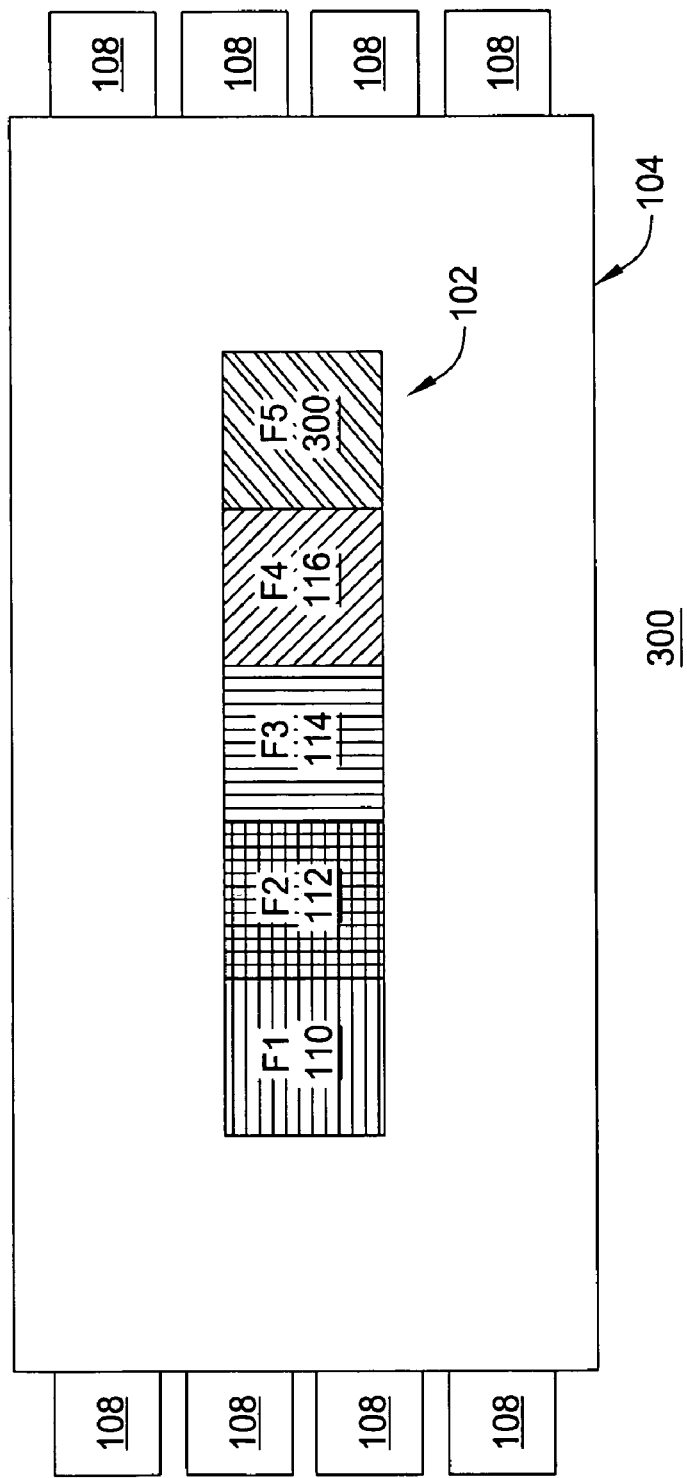
FIG. 3A is a top view of an exemplary embodiment of yet another configuration of dye filter layers on a semiconductor chip having photodetectors.

FIG. 3A is a top view of an exemplary embodiment of yet another configuration 300 of dye filter layers 102 on a semiconductor chip 104 constructed with five photodetectors 204 and five dye filter layers 102. Each dye filter layer 102 is integral with one of the photodetectors 204.

Figure 3B:
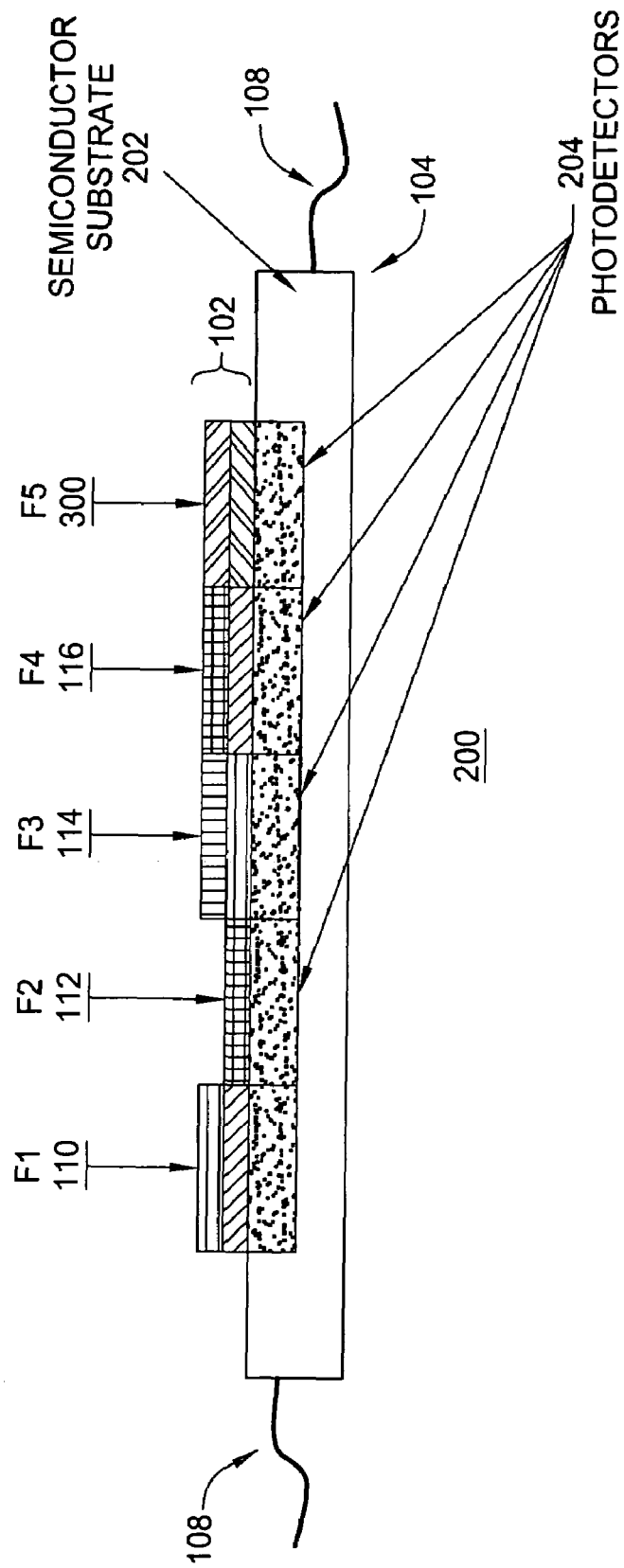
FIG. 3B is a side view of FIG. 3A.

FIG. 3B is a side view of FIG. 3A. In this exemplary embodiment, the semiconductor chip 104 includes a semiconductor substrate 202 constructed with five photodetectors 204 and five dye filter layers 102. Each dye filter layer 102 covers one of the photodetectors 204. In FIG. 3B, F2 112 is a single-layer structure, while F1 110, F3 114, F4 116, and F5 300 are double-layer structures. Other embodiments may have three or more dye filter layers 102, each layer being at least a single layer with at least one layer being a double layer.

FIGS. 4-8 illustrate the process of computing the measured X, Y, & Z tristimulus values using the exemplary embodiment of FIGS. 2A and 2B.

Figure 4:
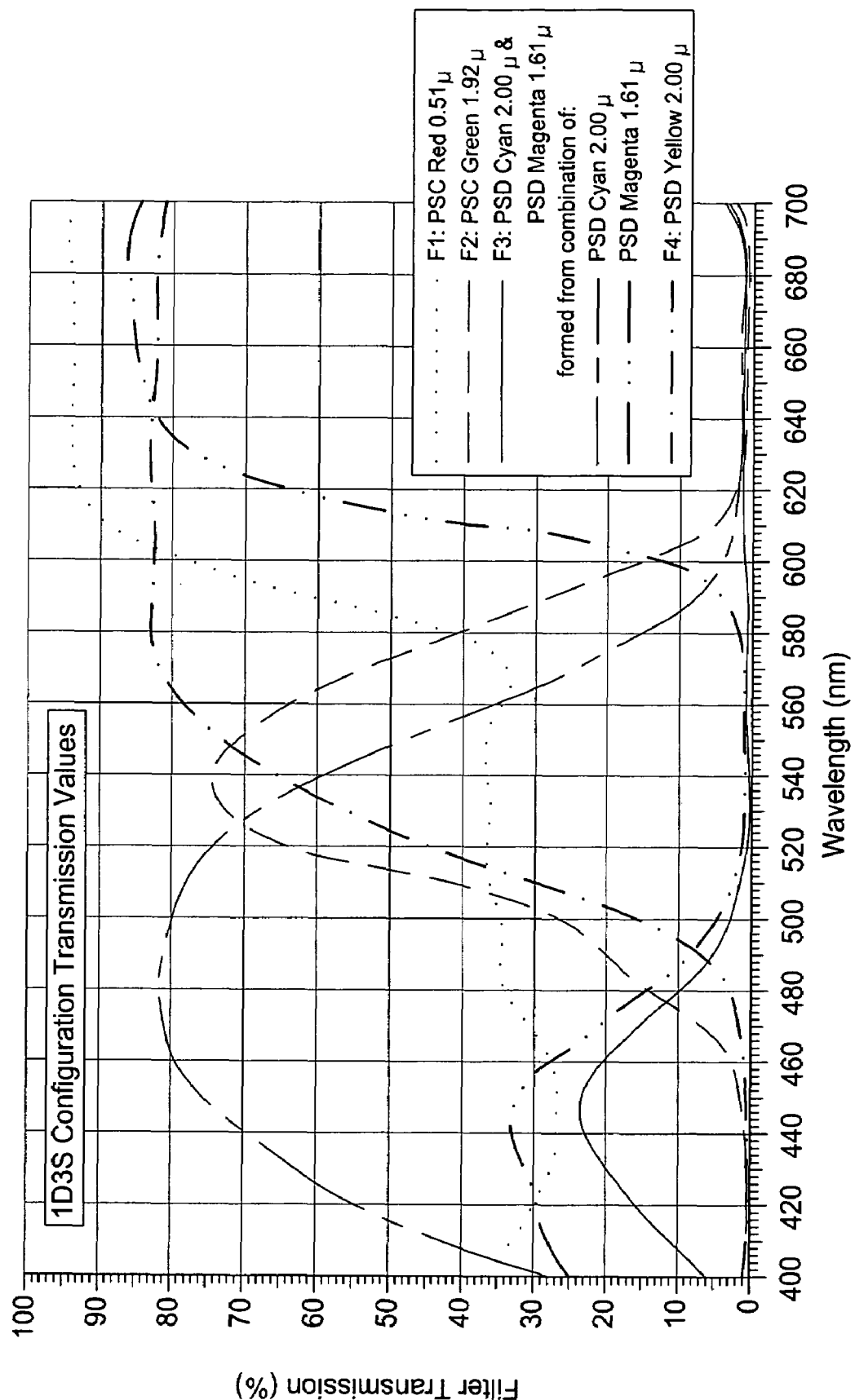
FIG. 4 is a graph of exemplary filter transmission values for the exemplary embodiment of FIGS. 2A and 2B.

FIG. 4 is a graph of exemplary filter transmission values for the exemplary embodiment of FIGS. 2A and 2B. FIG. 4 shows the transmission of 4 filter functions, F1, F2, F3, & F4. The photosensitive colors PSC® colorants listed in FIG. 4 are a family of pigments that are commonly used for producing color filter layers on semiconductor devices. Similarly, the Dyed (PSD™) colorants, which include cyan, magenta, and yellow colorants, are a family of dyes commonly used for producing color filter layers on semiconductor devices. Other embodiments may include any other pigments, dyes, and colorants suitable for construction of a semiconductor device.

Figure 5:
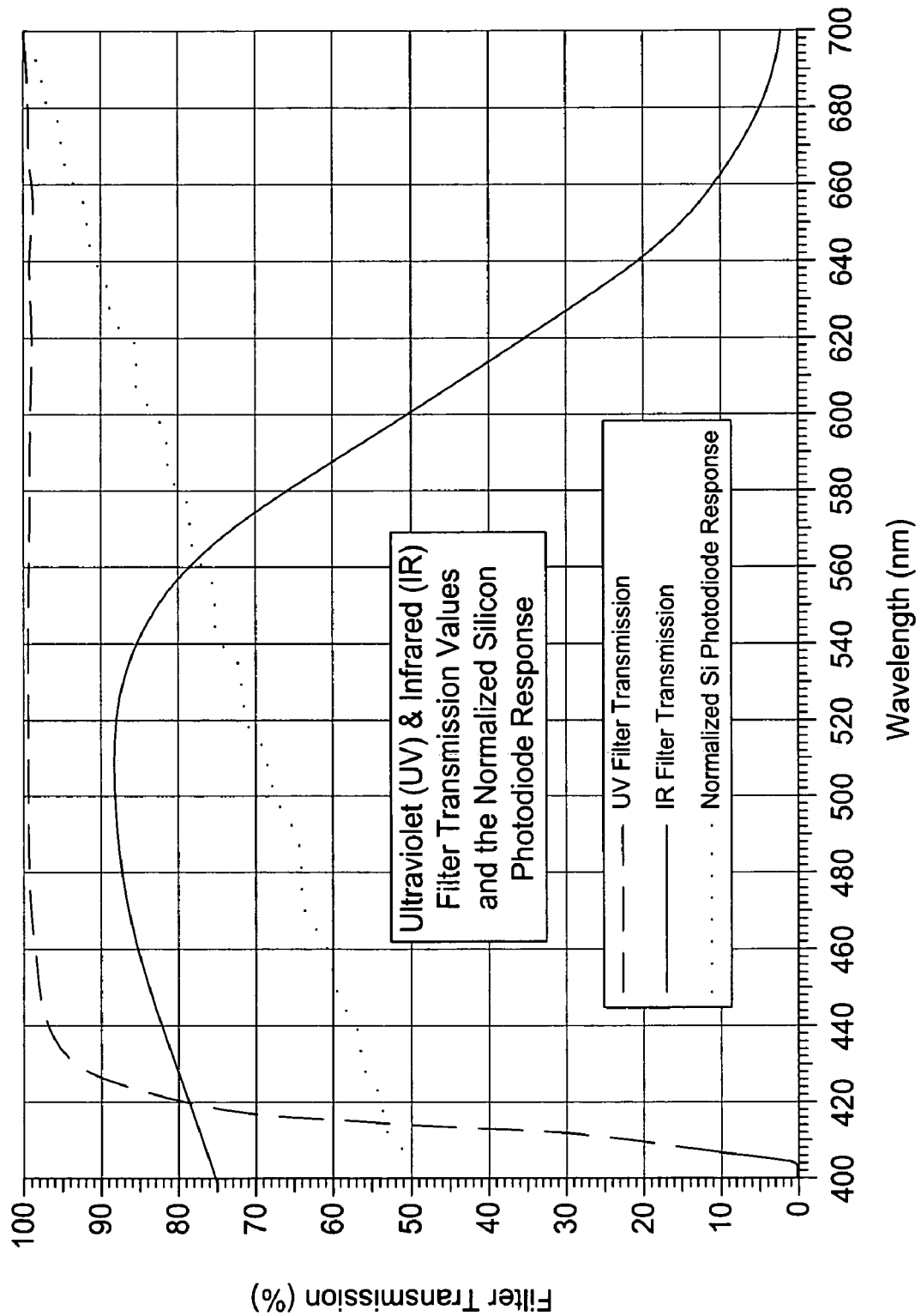
FIG. 5 is a graph of exemplary ultraviolet (UV) and infrared (IR) filter transmission values and the normalized silicon photodetector response for the exemplary embodiment of FIGS. 2A and 2B.

FIG. 5 is a graph of exemplary ultraviolet (UV) and infrared (IR) filter transmission values and the normalized silicon photodetector response for the exemplary embodiment of FIGS. 2A and 2B. Also plotted is a typical silicon photodiode spectral response function. FIG. 5 shows the transmission of the UV and IR filters that are needed to narrow the spectral range of the light that reaches the colorimeter chip.

Figure 6:
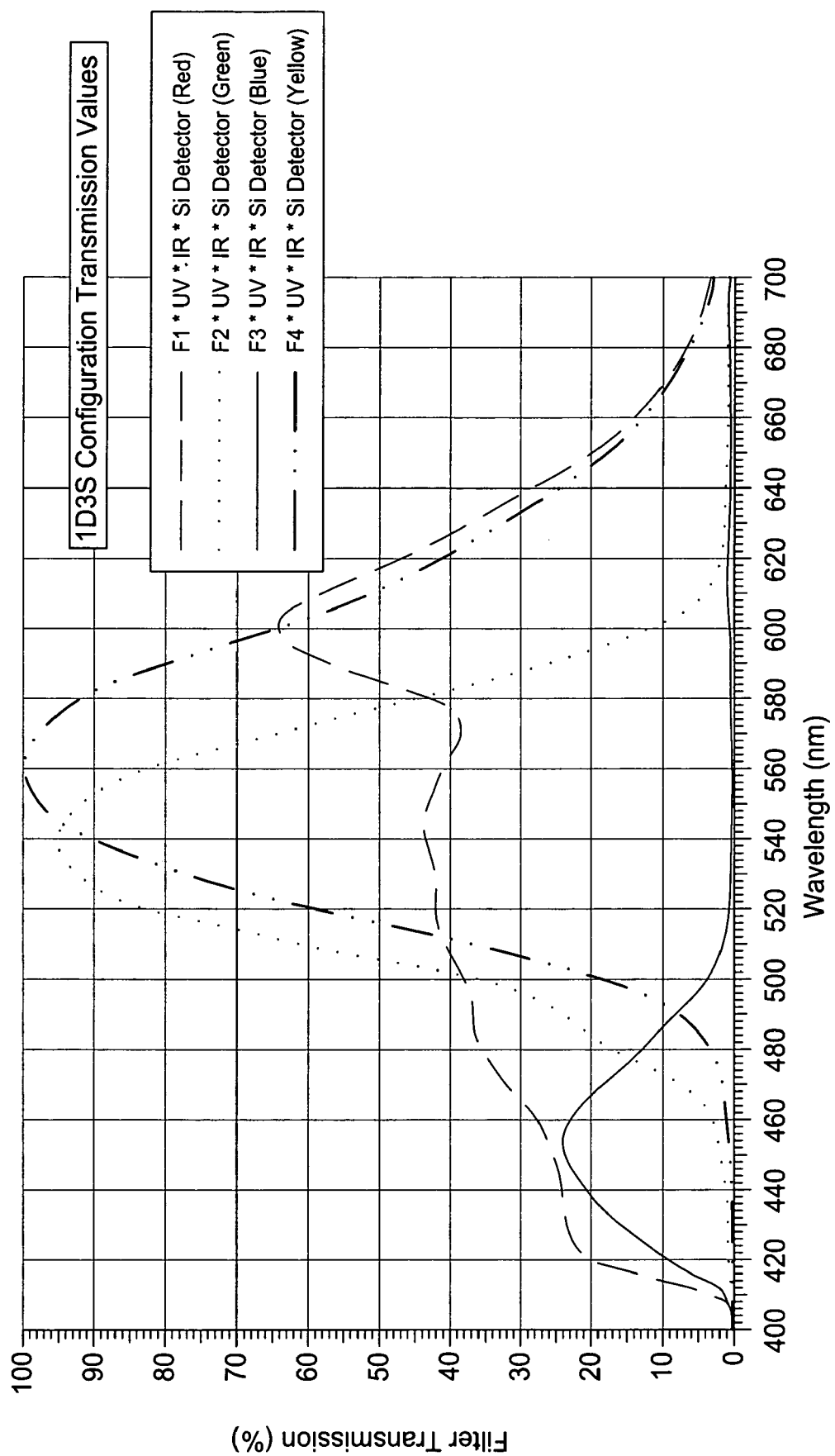
FIG. 6 is a graph of an exemplary normalized filter detector response for the exemplary embodiment of FIGS. 2A and 2B.

FIG. 6 is a graph of an exemplary normalized filter detector response for the exemplary embodiment of FIGS. 2A and 2B. These response functions are obtained by multiplying the filter transmissions shown in FIG. 4 with the UV and IR and silicon photodetector functions shown in FIG. 5.

Figure 7:
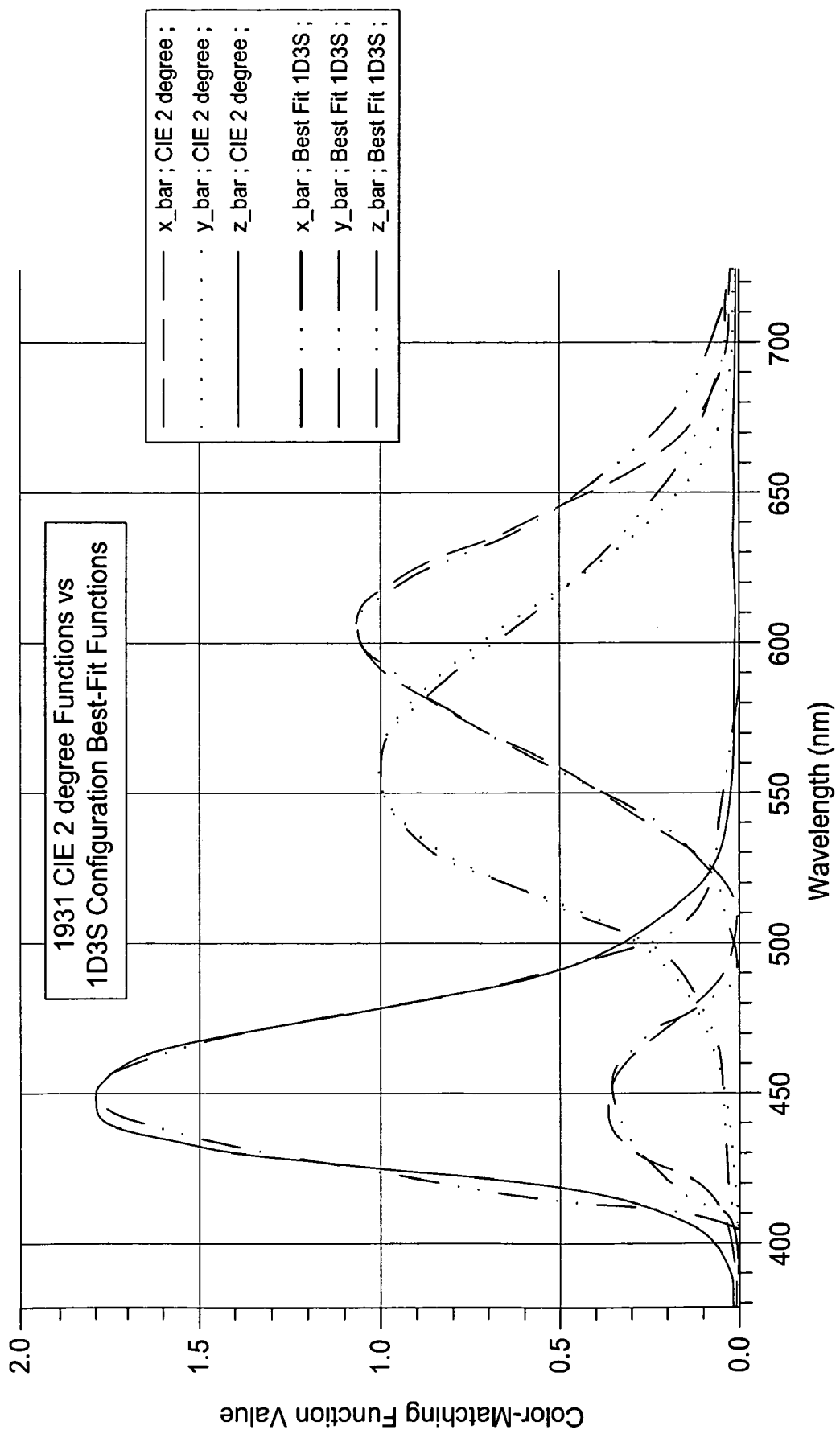
FIG. 7 is a graph comparing a best fit of the response functions of the exemplary embodiment of FIGS. 2A and 2B to target CIE 1931 2-degree color-matching functions.

FIG. 7 is a graph comparing a best fit of the response functions of the exemplary embodiment of FIGS. 2A and 2B to the 1931 2-degree CIE color-matching functions. This fit was obtained by performing a least squares fit to the CIE functions using the response functions shown in FIG. 6.

FIG. 8A is a list of an exemplary set of equations to calculate tristimulus values using the exemplary embodiment of FIGS. 2A and 2B. The set of equations is as follows uses the best fit least squares coefficients for calculating the X, Y, & Z tristimulus values.

$$X = (F1\text{detector}*C_{x1}) + (F2\text{detector}*C_{x2}) + (F3\text{detector}*C_{x3}) + (F4\text{detector}*C_{x4});$$

$$Y = (F1\text{detector}*C_{Y1}) + (F2\text{detector}*C_{Y2}) + (F3\text{detector}*C_{Y3}) + (F4\text{detector}*C_{Y4});$$

$$Z = (F1\text{detector}*C_{x1}) + (F2\text{detector}*C_{Z2}) + (F3\text{detector}*C_{Z3}) + (F4\text{detector}*C_{Z4});$$

FIG. 8B is a table of exemplary coefficients computed using the equations of FIG. 8A for the best fit of FIG. 7. The table is as follows and shows example values of the best fit coefficients $C_{jk}$.

| X Coef | Value | Y Coef | Value | Z Coef | Value |
|---|---|---|---|---|---|
| $C_{x1} =$ | 0.020482 | $C_{y1} =$ | 0.006561 | $C_{z1} =$ | 0.003158 |
| $C_{x2} =$ | −0.081360 | $C_{y2} =$ | 0.017303 | $C_{z2} =$ | 0.007581 |
| $C_{x3} =$ | 0.077814 | $C_{y3} =$ | 0.001845 | $C_{z3} =$ | 0.503504 |
| $C_{x4} =$ | 0.096484 | $C_{y4} =$ | 0.049131 | $C_{z4} =$ | −0.006500 |

Various exemplary embodiments may be generated using a method for designing a calorimeter having integral CIE color-matching filters. This method can be used to calculate filter layer structure and thicknesses of layers. A set of channels is determined from a plurality of channels so that a linear combination of the set of channels matches a set of CIE-like target color-matching functions within a tolerance. Each channel integrates at least one detector and at least one filter onto a single semiconductor substrate. A set of filters is determined for each channel. Each filter is an absorptive filter and each filter has at least one layer. There is at least one channel in which the filter has a double layer. A thickness is determined for each layer. A colorant is determined for each layer from a set of colorants. With a sufficiently high signal-to-noise ratio (SNR), good accuracy was obtained for a colorimeter with at least three or four filters with each filter being at least a single layer and one layer being a double layer. This provided the best approximation to the CIE-like target color-matching functions with the least cost. Other exemplary embodiments of calorimeters having good performance and accuracy included a single double coated filter layer and three single coated filter layers, two double coated layers and two single coated filter layers and three double coasted and one single coated filter layers. Some exemplary embodiments had filter layer thicknesses between about 0.50 and 2.00 microns. One of ordinary skill in the art will recognize that various other combinations of layer structures and thicknesses are also within the scope of the present invention.

Figure 9A:
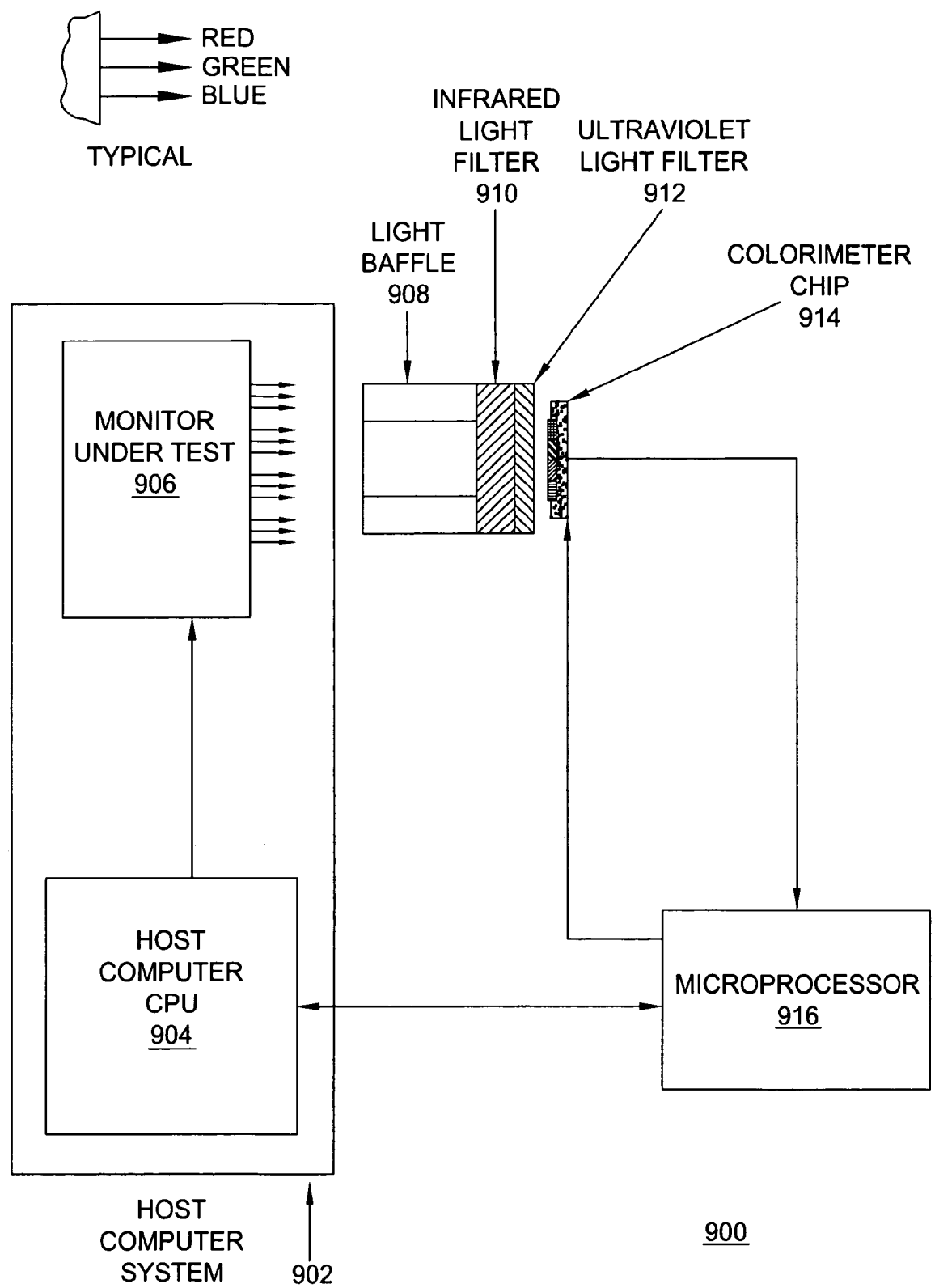
FIG. 9A is a block diagram of an exemplary embodiment of a computer monitor calibration system.

FIG. 9A shows an exemplary embodiment of a computer monitor calibration system 900. In this exemplary embodiment, the computer monitor calibration system 900 includes a host computer system 902. The host computer system 902 includes a computer processing unit (CPU) 904 and a monitor under test 906. The CPU 904 is running a monitor calibration application and controls the red, green, and blue output to the monitor under test 906. The monitor under test 906 emits red, green, and blue light that travels through a light baffle 908, an infrared light filter 910, and an ultraviolet light filter 912 and then, toward a colorimeter chip 914 with integral dye filters. The light baffle 908 restricts the angle of the light detected and the infrared light filter 910 and the ultraviolet light filter 912 restricts the spectral range of the light detected by the colorimeter chip 914. However, other embodiments may include none of these or one or more of these filters or other filters in different orders or arrangements, as needed. The colorimeter chip 914 sends an input of raw count data to a microprocessor 916, which sends channel selector input to the colorimeter chip 914. The microprocessor 916 controls the colorimeter chip 914. There is two-way communication (e.g., via cable, USB, or wireless means) between the microprocessor 916 and the CPU 904. Although shown outside for illustrative purposes, the microprocessor 916 is located inside calibrator device housing. The microprocessor 916 sends command input and raw data output. The present invention is not limited to any particular arrangement of parts of the computer monitor calibration system. Nor is the present invention limited to computer monitor calibration systems, but includes various other colorimetry applications. Other embodiments include various other arrangements of the major components of the computer monitor system; for example, the CPU 904 and monitor 906 may be combined.

Figure 9B:
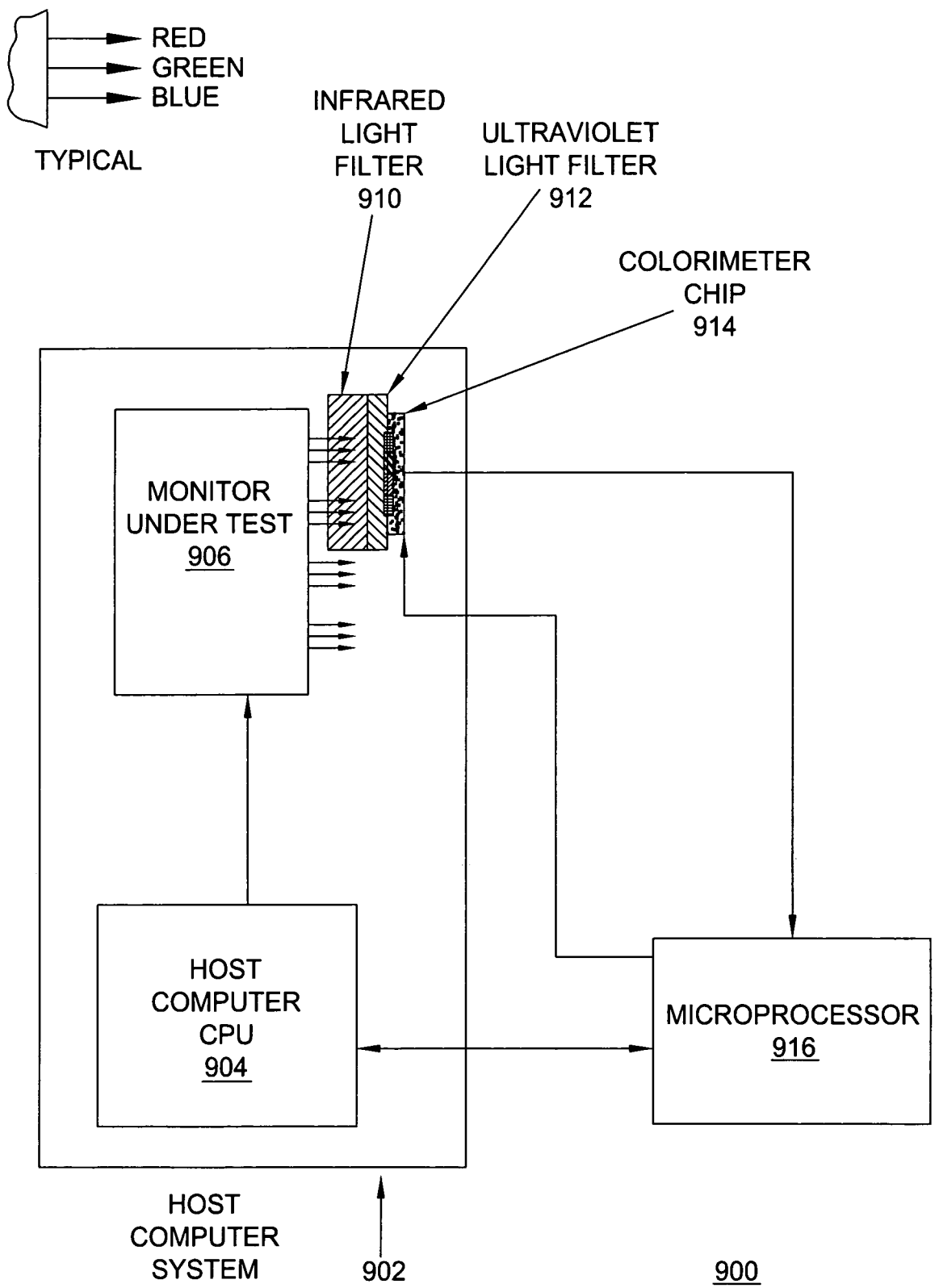
FIG. 9B is a block diagram of another exemplary embodiment of the computer monitor calibration system of FIG. 9A, in which the colorimeter chip and its controlling microprocessor are embedded within the computer monitor under test.

FIG. 9B shows another exemplary embodiment of the computer monitor calibration system 900 of FIG. 9A, in which the calorimeter chip and its controlling microprocessor are embedded within the computer monitor under test. FIG. 9B differs from the computer monitor calibration system 900 of FIG. 9A in that the colorimeter chip 914 and its microprocessor controller 916 are embedded in the monitor under test 906. In other words, the calorimeter chip 914 is attached directly to the screen of the monitor under test 906 inside the housing of the monitor under test 906.

Figure 10A:
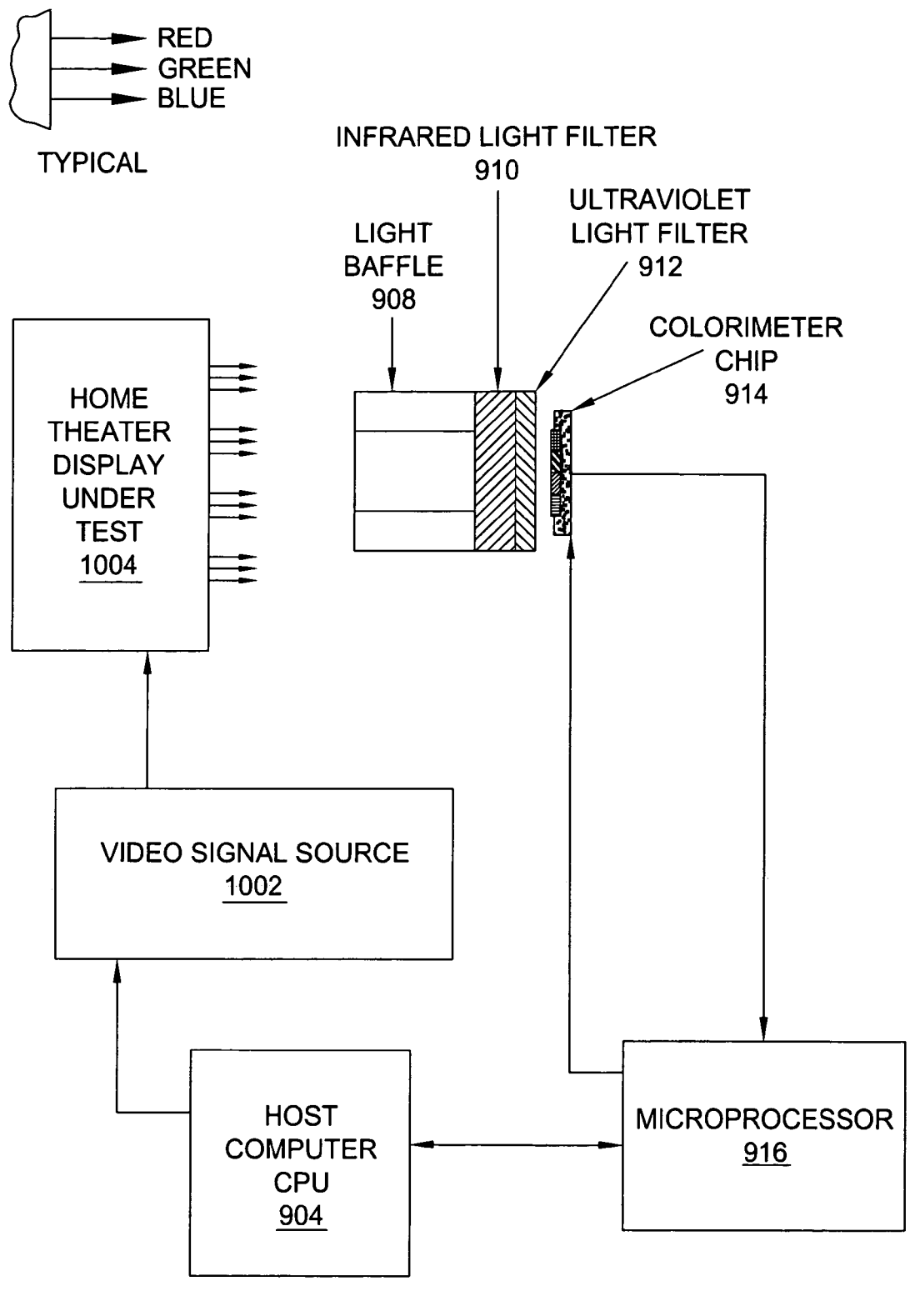
FIG. 10A is a block diagram of an exemplary embodiment of a home theatre display calibration system.

FIG. 10A shows an exemplary embodiment of a home theater display calibration system 1000. A home theater display includes a plasma television (TV), Liquid Crystal Display (LCD) TV, Digital Light Processing™ (DLP®) TV, and the like. In this exemplary embodiment, the host computer CPU 904 is running a home theater calibration application. The video signal source 1002 for the home theater is a video source, such as a digital video disk (DVD) player or a video signal generator. The host computer CPU 904 sends command output to control the video signal source 1002. The host computer CPU 904 has two-way communication with the microprocessor 916. The microprocessor 916 is located in the calibrator device housing. The microprocessor 916 controls the colorimeter chip 914, including sending channel selector input to the colorimeter chip 914. The calorimeter 914 has integral dye filters and sends raw count data to the microprocessor 916. The video signal source 1002 sends video signal output to a home theater display under test 1004. The home theater display under test 1004 emits light toward the light baffle 908. The light passes through the light baffle 908 to the infrared light filter 910, the ultraviolet light filter 912 and, then, to the colorimeter chip 914. One of ordinary skill in the art will recognize that other embodiments may have more or less components in different arrangements for other colorimetry applications, yet these other embodiments are still within the inventive concept.

Figure 10B:
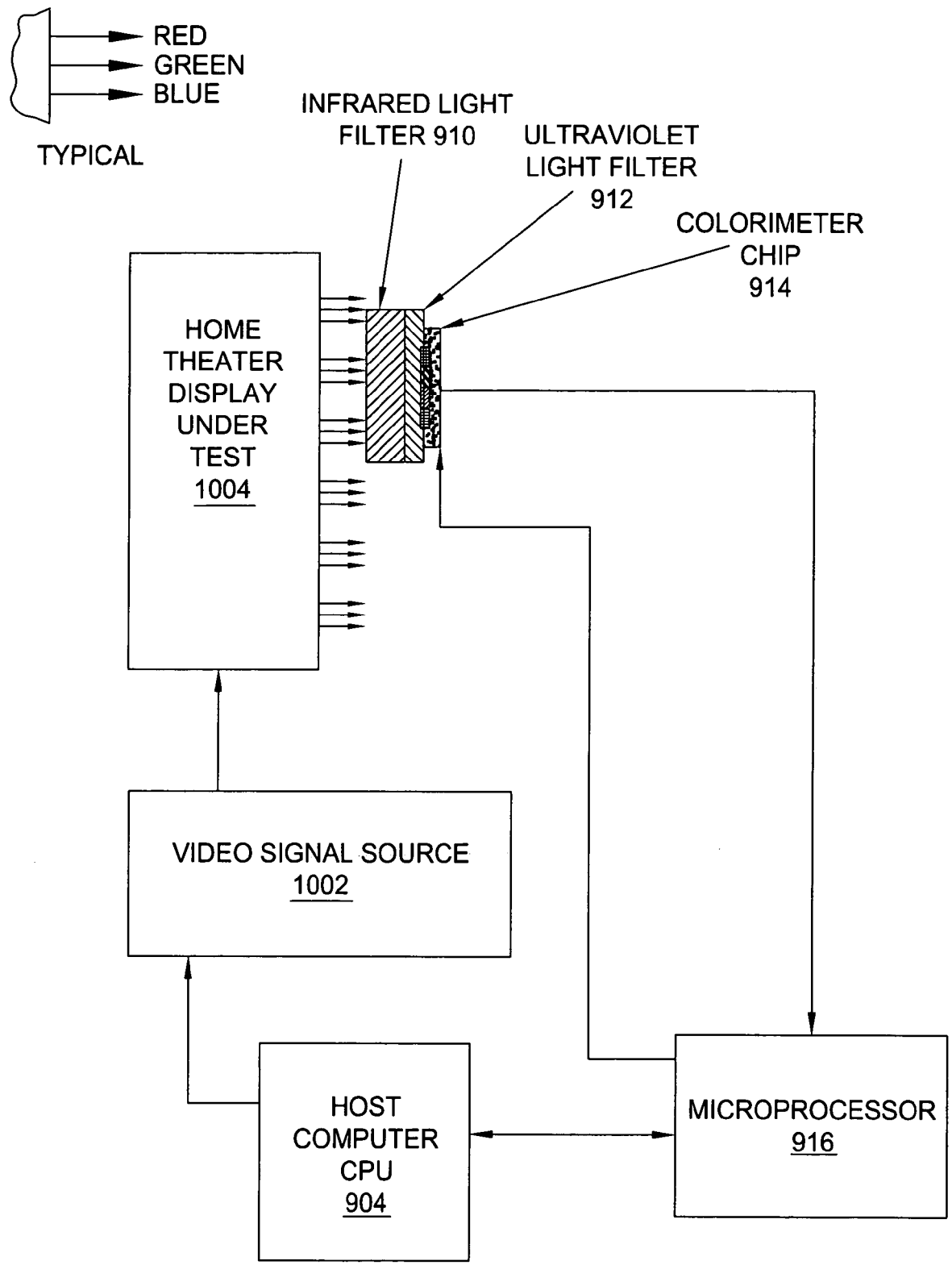
FIG. 10B is a block diagram of another exemplary embodiment of the home theatre display calibration system of FIG. 10A, in which the calorimeter chip and its controlling microprocessor are embedded within the home theatre display under test.

FIG. 10B shows another exemplary embodiment of the home theatre display calibration system 1000 of FIG. 10A, in which the calorimeter chip and its controlling microprocessor are embedded within the home theatre display under test. In this exemplary embodiment, the colorimeter chip 914 with integral dye filters, along with the infrared 910 and ultraviolet 912 light filters and other associated components, including the microprocessor controller 916, are all located inside the housing of the home theater display under test 1004 that is being calibrated. In other words, the colorimeter chip 914 is attached directly to the display screen of the home theater display under test. In this arrangement, the light baffle 908 of FIG. 10A is likely not necessary. Likewise, other arrangements of different and varied components are also within the scope of the present invention.

Figure 11A:
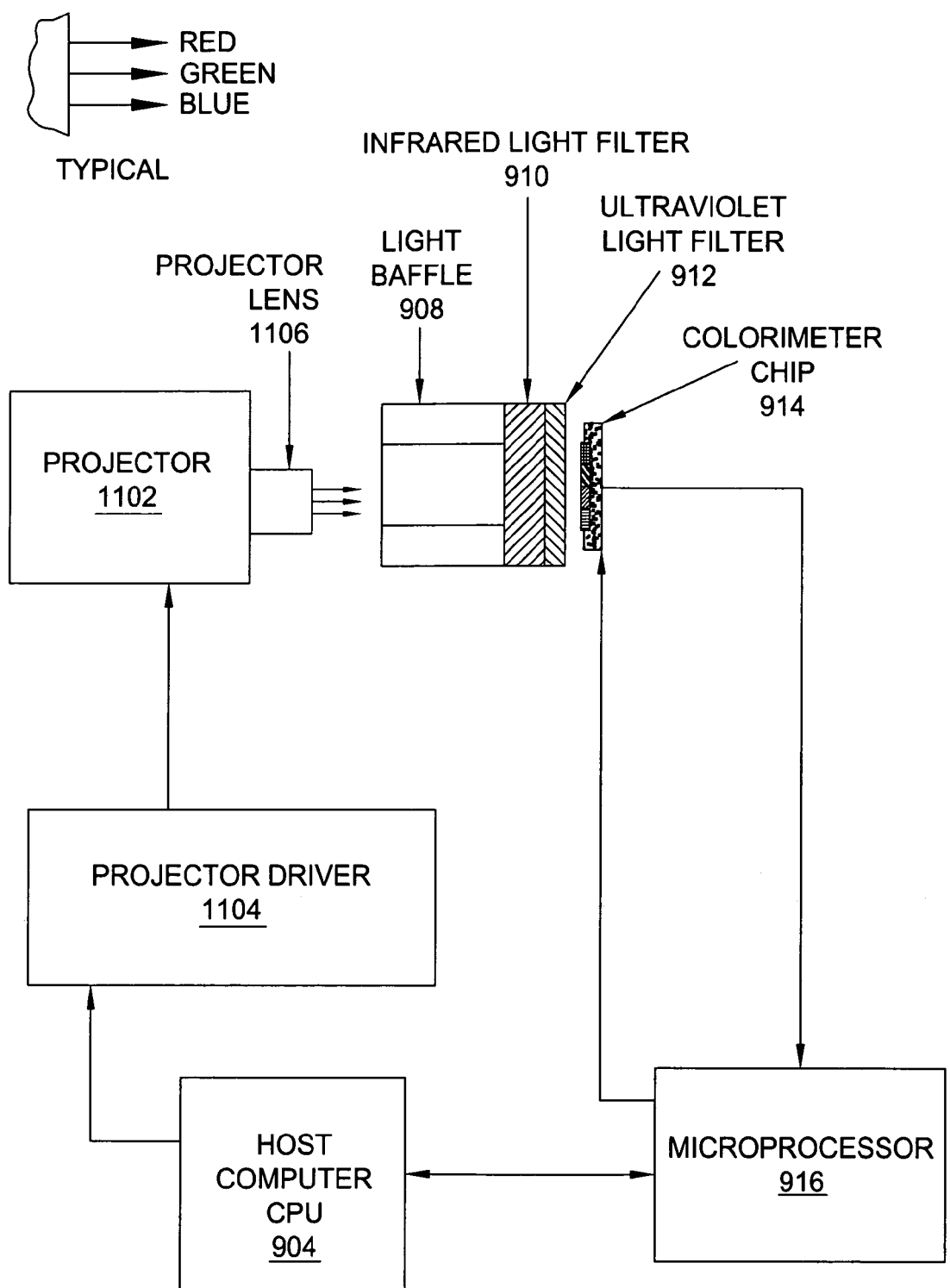
FIG. 11A is a block diagram of an exemplary embodiment of a projector calibration system, in which the calorimeter chip views the light emitted from the projector directly.

FIG. 11A is a block diagram of an exemplary embodiment of a projector calibration system 1100, in which the calorimeter chip views the light emitted from the projector directly. In this exemplary embodiment, the colorimeter chip 914 directly views the light emitted from a projector 1102. The signal source is a projector driver 1104, such as a computer video card or a video source, e.g., a DVD player or a video signal generator. The host computer CPU 904 sends command output to control the projector driver 1104, which sends a signal output toward the projector 1102. Light is emitted through a projector lens 1106 toward the light baffle 908, infrared light filter 910, ultraviolet light filter 9121, and the colorimeter chip 914. The host computer CPU 904 has two-way communication with the microprocessor 916. The microprocessor receives raw count data from the colorimeter chip 914 and sends channel selector input to the colorimeter chip 914.

Figure 11B:
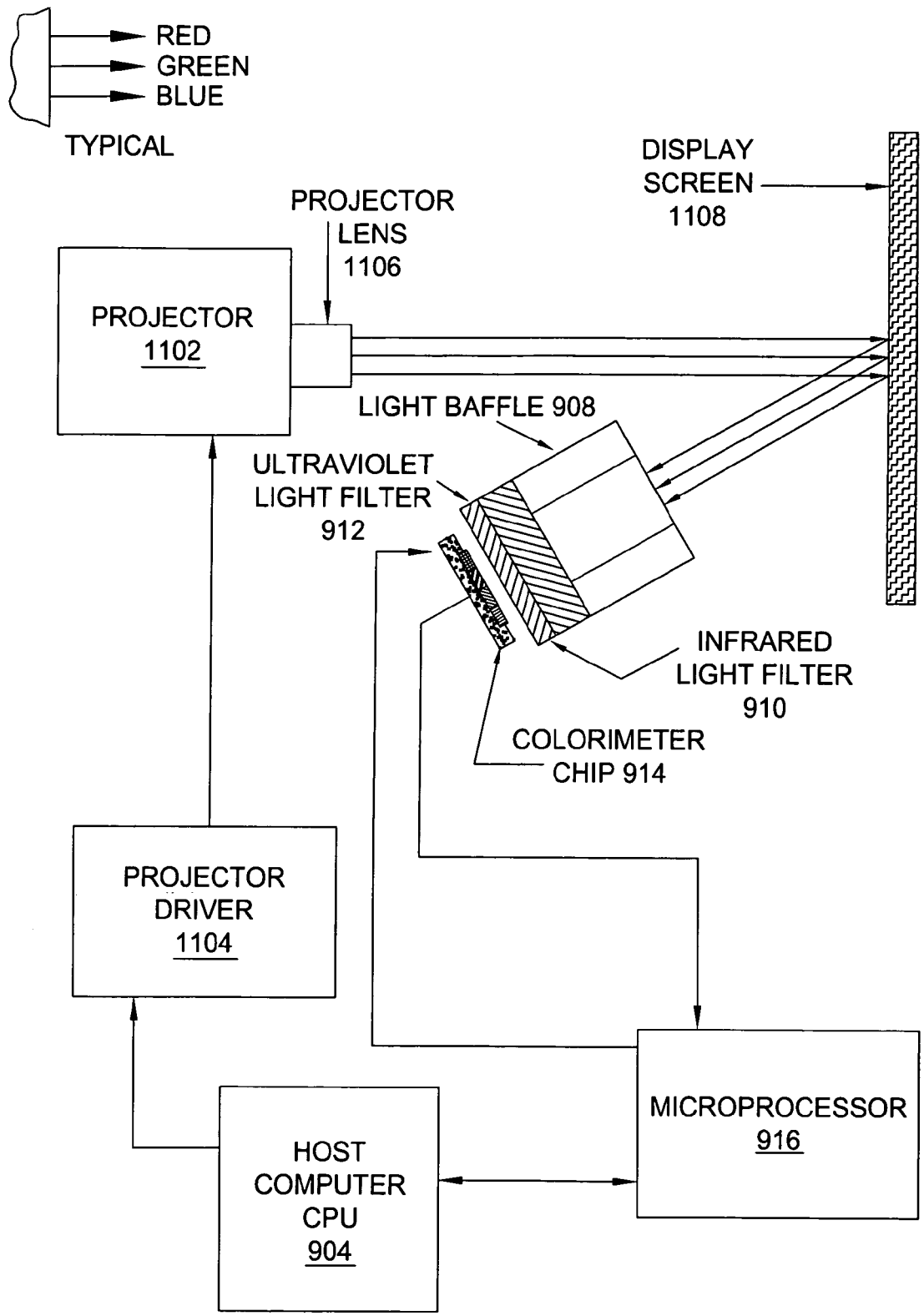
FIG. 11B is a block diagram of another exemplary embodiment of the projector calibration system of FIG. 11A, in which the colorimeter chip views the light emitted from the projector after reflection from a display screen.

FIG. 11B shows another exemplary embodiment of the projector calibration system 1100 of FIG. 11A, in which the colorimeter chip views the light emitted from the projector after reflection from a display screen. In this exemplary embodiment, the calorimeter chip 914 views the light reflected from a display screen 1108, after the light was emitted from the projector 1102 through the projector lens 1106. Likewise, other arrangements of different and varied components are also within the scope of the present invention.

Figure 12:
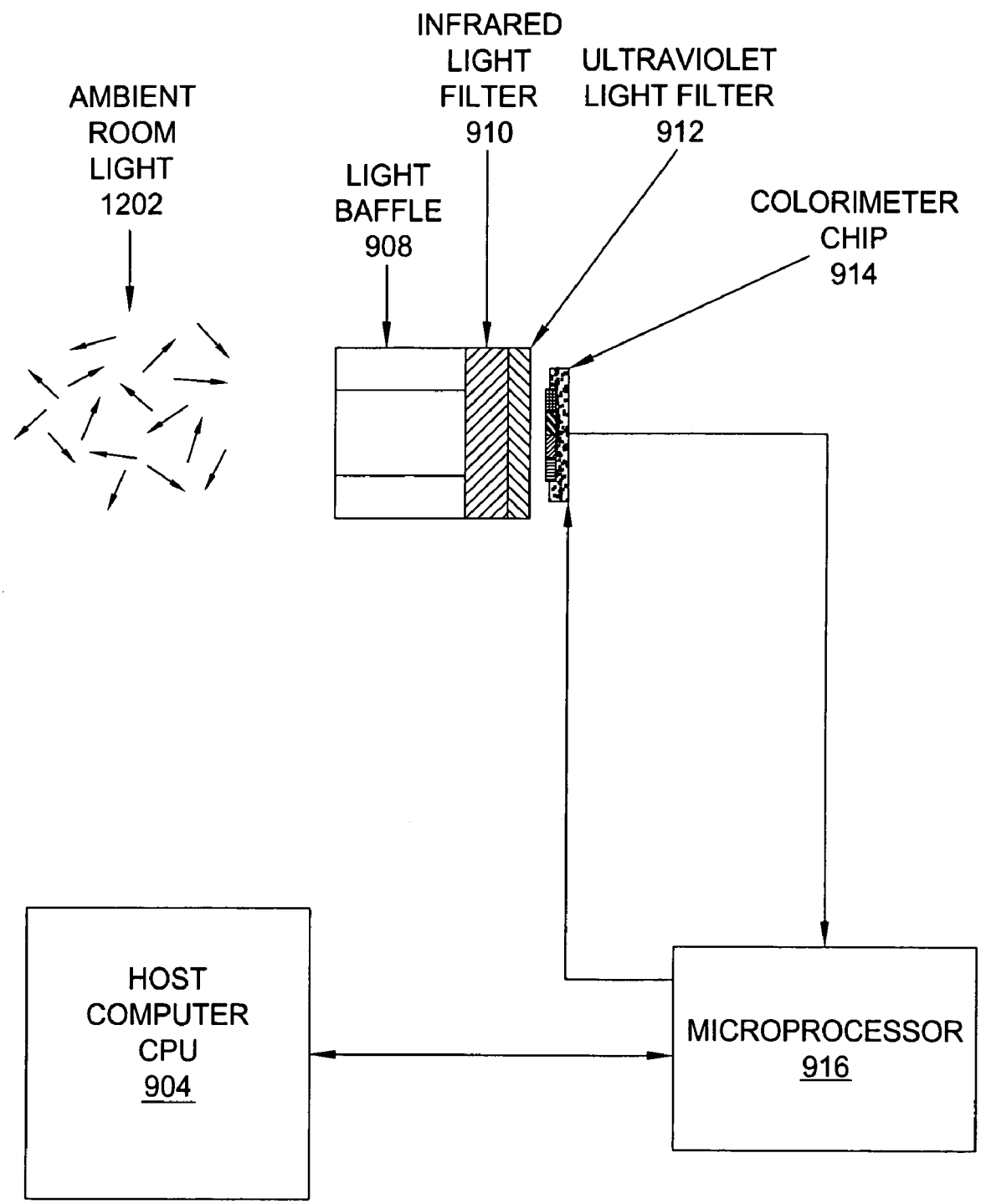
FIG. 12 is a block diagram of an exemplary embodiment of an ambient light measurement system.

FIG. 12 shows an exemplary embodiment of an ambient light measurement system 1200. In this exemplary embodiment, there is no specific light emitter being calibrated. Instead, the ambient room light 1202 is being characterized in terms of, for example, luminance level and calorimetric readings. One of skill in the art will recognize that various arrangements of different and varied components of ambient light measurement systems 1200 are also within the scope of the present invention.

Figure 13:
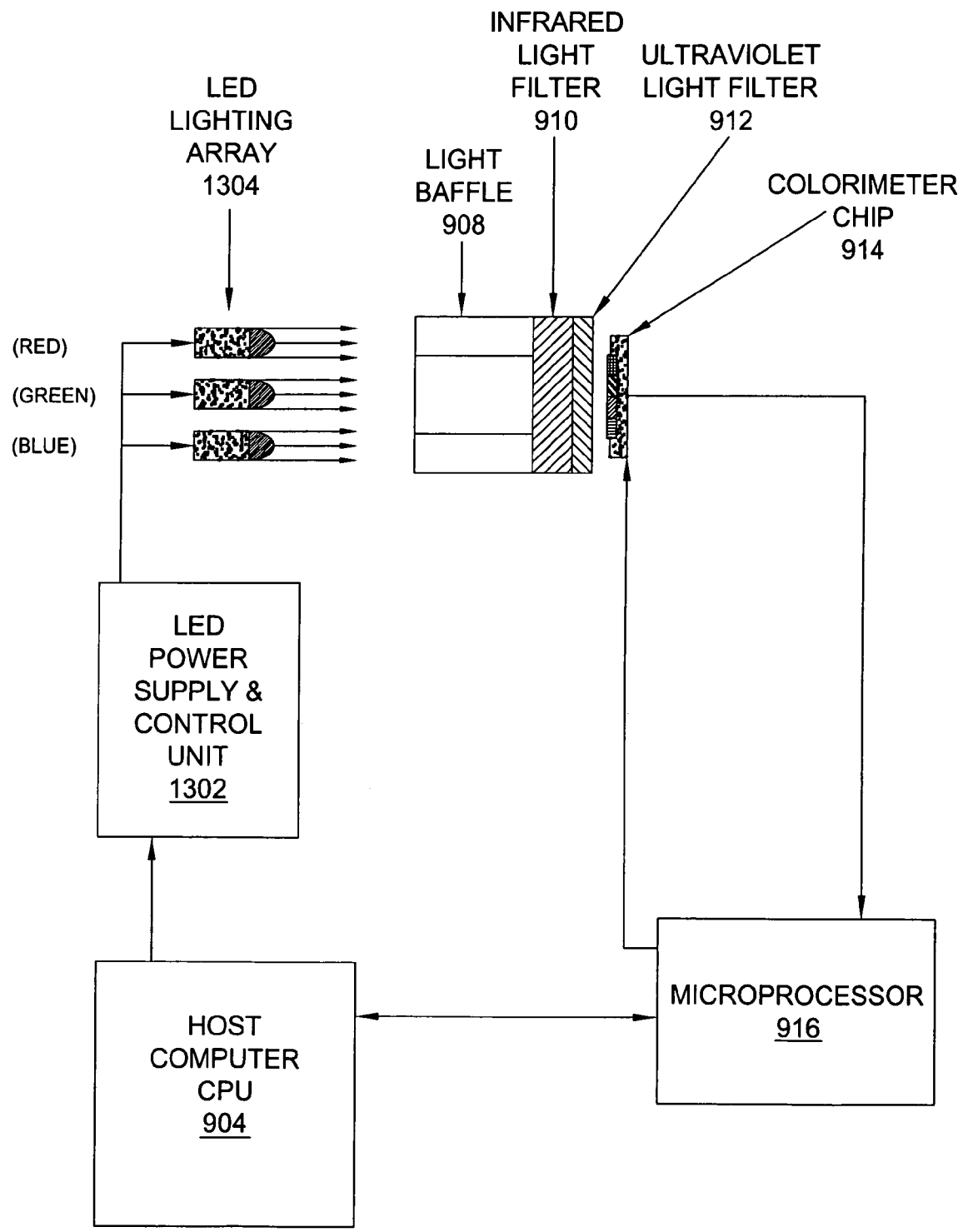
FIG. 13 is a block diagram of an exemplary embodiment of a light emitting diode (LED) measurement and control application.

FIG. 13 shows an exemplary embodiment of a light emitting diode (LED) measurement and control application 1300. In this exemplary embodiment, the host computer CPU 904 sends command input to a LED power supply and control unit 1302, which provides power supply outputs to LEDs in an LED lighting array 1304. Light emitted from the LEDs is directed toward the light baffle, infrared light filter 910, ultraviolet light filter 912, and calorimeter chip 914. One of skill in the art will recognize that various arrangements of different and varied components of LED measurement and control applications 1300 are also within the scope of the present invention.

Various embodiments of tristimulus colorimeters on a single semiconductor chip having at least three detectors, each detector being coated by colorant filters, each filter having at least one layer and at least one filter having a double layer have been described. Colorimeters determine CIE tristimulus values of an incident light from inputs to the filters and detectors. Colorimeters having integral dye filters may be constructed on a single silicon chip embodying all the detectors and electronics, coated over each detector by a permanently deposited filter layer. Colorants may be directly deposited on the detectors, rather than using a plastic substrate for a filter.

The present invention has many advantages, including greater optical efficiency, increased lifetime, increased mechanical robustness, reduced cost of manufacture, and reduced cost of calibration. Greater optical efficiency is achieved, because the detectors can be abutted and need not be separated. This proximity reduces the requirements for diffusers and lenses that have in the past been required to homogenize the light over the large area of the composite sensor. Removing optical elements increases light throughput and efficiency for a given active area of the device. Because no glue and mechanical attachment is necessary, the lifetime is increased. Furthermore, constructing integral dye filters by, for example, depositing multiple materials on detectors increases the closeness of the color-matching functions of the spectral sensitivities of a calorimeter, increasing its accuracy. Reduced cost of calibration is achieved, because unit-to-unit uniformity is increased so that calibration of each unit is unnecessary. Instead, a few representative units in a lot can be calibrated. In addition, the small size of the colorimeter chip and its associated components allows the complete colorimeter to be embedded in the light emitting source that is to be measured, as shown in FIGS. 9B and 10B (and could also be embedded in the application shown in FIG. 11A).

Various applications, including a computer monitor calibration system, a home theatre display calibration system, a projector calibration system, an ambient light measurement system, and a light emitting diode (LED) measurement and control application have also been described. For example, a colorimeter having integral dye filters according to the present invention may be implemented in a device such as the Spyder2™, available from Datacolor, in Lawrenceville, N.J., which features a colorimeter for advanced amateurs, professionals, and consumers to calibrate monitors and to create International Color Consortium (ICC) or other industry-standard display profiles for cathode ray tube (CRT), LCD or notebook and/or projective displays. One of skill in the art will recognize that the present invention may be implemented in many other colorimetry applications in many industries.

While the foregoing is directed to embodiments of the present invention, other and further embodiments of the invention may be devised without departing from the basic scope thereof, and the scope thereof is determined by the claims that follow.

What is claimed is:

1. A colorimeter, comprising:
a semiconductor substrate having at least four photodetectors;
at least four filters permanently deposited on the at least four photodetectors, one of the at least four filters having a double layer and three of the at least four filters having single layers, wherein the double layer is cyan and magenta and the single layers are red, green, and yellow; and
a plurality of channels including the at least four photodetectors and the at least four filters so that linear combinations of a plurality of spectral responses of the channels approximate a set of CIE-like target color-matching functions.

2. A colorimeter, comprising:
a semiconductor substrate having four photodetectors;
at least four filters permanently deposited on the four photodetectors, wherein at least two of the at least four filters include double colorant layers and at least two of the at least four filters include single colorant layers; and
a plurality of channels including the four photodetectors and the at least four filters so that linear combinations of a plurality of spectral responses of the channels approximate a set of CIE-like target color-matching functions.

3. The colorimeter of claim 1, further comprising:
a processor for selecting the plurality of channels from among a set of potential channels so that linear combinations of the plurality of spectral responses approximate the set of CIE-like target color-matching functions.

4. The colorimeter of claim 2, further comprising:
a processor for selecting the plurality of channels from among a set of potential channels so that linear combinations of the plurality of spectral responses approximate the set of CIE-like target color-matching functions.

* * * * *